US006999583B2

(12) United States Patent
Valenti et al.

(10) Patent No.: US 6,999,583 B2
(45) Date of Patent: Feb. 14, 2006

(54) CROSSTALK IDENTIFICATION FOR SPECTRUM MANAGEMENT IN BROADBAND TELECOMMUNICATIONS SYSTEMS

(75) Inventors: Craig F. Valenti, Morristown, NJ (US); Kenneth Kerpez, Long Valley, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 444 days.

(21) Appl. No.: 09/922,064

(22) Filed: Aug. 3, 2001

(65) Prior Publication Data
US 2002/0041565 A1    Apr. 11, 2002

Related U.S. Application Data

(60) Provisional application No. 60/262,548, filed on Jan. 17, 2001, provisional application No. 60/222,734, filed on Aug. 3, 2000.

(51) Int. Cl.
H04M 1/76    (2006.01)
H04M 7/00    (2006.01)
H04M 9/00    (2006.01)

(52) U.S. Cl. .................. 379/417; 379/416; 370/201
(58) Field of Classification Search ........ 379/416–417; 370/201
See application file for complete search history.

(56) References Cited

U.S. PATENT DOCUMENTS

| 6,101,172 A | * | 8/2000 | van Bavel et al. ........ 379/417 |
| 6,529,906 B1 | * | 3/2003 | Chan ........................... 707/8 |
| 2001/0012321 A1 | * | 8/2001 | Terry .......................... 379/417 |

* cited by examiner

*Primary Examiner*—Sinh Tran
*Assistant Examiner*—Ramnanda Singh
(74) *Attorney, Agent, or Firm*—William A. Schoneman; Joseph Giordano

(57) ABSTRACT

Crosstalk between subscriber loops used to transmit different broadband services through the same bundled telephone cable is a significant limitation to providing digital subscriber line services. A method for estimating the crosstalk, identifying the sources of the crosstalk and predicting additional sources of crosstalk are disclosed. The crosstalk sources are identified in the frequency domain by maximizing the correlation with a "basis set" of received crosstalk PSDs which consist of the cascade of a finite set of known transmit PSDs types times a representative set of crosstalk couplings. Multiple crosstalk types are identified with a technique of successive spectral subtraction. This information can be used to perform crosstalk cancellation and spectrum management for DSL systems.

8 Claims, 12 Drawing Sheets

CROSSTALK IDENTIFICATION FOR SPECTRUM MANAGEMENT IN BROADBAND TELECOMMUNICATIONS SYSTEMS

RELATED APPLICATIONS

The present application claims the benefit of U.S. Provisional Application No. 60/222,734 filed on Aug. 3, 2000, entitled "Automated System For Crosstalk Identification and Spectrum Management on Multi-Pair Cables" and U.S. Provisional Patent Application No. 60/262,548 filed on Jan. 17, 2001 and entitled "Frequency-Domain Approach To Crosstalk Identification And Cancellation In Digital Subscriber Line Systems."

FIELD OF THE INVENTION

This invention is related to the identification of crosstalk between subscriber loops transmitting high bandwidth telecommunication services through bundled telephone lines or cables, particularly to identification of crosstalk in digital subscriber line ("DSL") service loops. Identification of the crosstalk enables minimization of its effect through crosstalk cancellation as part of the spectrum management of the local plant in a telecommunications system.

BACKGROUND

The mainstay of the telephone company local network is the local subscriber loop. The local subscriber loop is now being used to provide broadband digital telecommunication services such as DSL service. Such broadband DSL services include integrated digital subscriber network ("ISDN"), high-rate digital subscriber line ("HDSL"), asymmetrical digital subscriber lines ("ADSL") and very high rate digital subscriber lines ("VDSL") technology. DSL services allow residential and business customers to send and/or receive digital data at higher rates of speed than were previously possible using analog modem technology.

DSL technologies are engineered to operate over a class of subscriber loops, such as nonloaded loops (18 kft) or Carrier Serving Area (CSA) loops (9 to 12 kft). Digital Subscriber Line (DSL) technology exploits the existing, ubiquitous, copper telephone loop plant to provide megabit per second (Mbps) high-speed Internet access and other services. frequency spectrum in local loop plants there may be no way to avoid problems that will ultimately result in custmer disappointment, delay and higher costs.

The American National Standards Institute (ANSI) Working Group T1E1.4, being responsible for DSL standards on ISDN Basic Access, HDSL and ADSL, initiated a project in 1998 to develop relevant standards for spectrum management. ANSI Standard T1.417-2001, *Spectrum Management for Loop Transmission Systems*, was approved and issued in January 2001. This ANSI standard applies relatively rigid rules uniformly across the entire loop plant. This has led to a number of proposals for new DSL systems, for example the class of symmetric DSL ("SDSL"). Unfortunately, this creativity complicates the problem of spectrum management, as is apparent from Table 1, which shows the nine currently agreed classes of DSL systems.

TABLE 1

Spectrum Management Classes

| Spectrum Management (SM) Class | Deployment Guideline, max loop length EWL 26 gauge kft | Included DSL Technologies |
|---|---|---|
| Class 1 | all nonloaded loops | ISDN<br>SDSL < 300 kbps<br>2-line & 4-line DAML |
| Class 2 | 11.5 kft | SDSL < 512 kbps |
| Class 3 | 9 kft | HDSL and 784 kbps SDSL |
| Class 4 | 10.5 kft | HDSL2 (single-pair HDSL) |
| Class 5 | all nonloaded loops | ADSL, CAP/QAM RADSL, G.lite (partial-overlapped) |
| Class 6 | Not defined | VDSL |
| Class 7 | 6.5 kft | SDSL < 1568 kbps |
| Class 8 | 7.5 kft | SDSL < 1168 kbps |
| Class 9 | 13.5 kft | Overlapped, echo-canceled ADSL |

The great majority of residential customers and many business customers are served by such metallic (copper) twisted pair cables connected from a local switch in the central office ("CO") to the subscriber's land-line telephones. For each subscriber, telephone and DSL signals travel on a single twisted pair from a central office (CO) to the subscriber. Many, sometimes thousands, of twisted pairs are wrapped together in a single cable. The twisting of the pairs keeps the average amount of electromagnetic coupling between the balanced circuits on each pair to a low level, resulting in low crosstalk coupling between different circuits at voice frequencies. Twisted-pair cabling was designed and built to carry voice services, requiring only a very low probability of intelligible crosstalk at voice frequencies, generally up to a few kHz.

Crosstalk generally increases, however, with increasing frequency, and because DSL frequencies extend into the MegaHertz ("MHz") range, crosstalk becomes the major limitation to high-speed DSL. Because a number of individual twisted pairs are wrapped together in a binder, and a number of binders are in each telephone cable. (there are typically 12, 13, 25, 50 or 100 pairs in a binder) the crosstalk between pairs in the same binder is much higher than it is between pairs in different binders. Telephone cabling can be thought of as a multi-input, multi-output interference channel with crosstalk in between 12 and 100 channels, although there are typically a smaller number of high-power crosstalkers in each pair.

DSL technology is still fairly new. The general approach to date has been to treat each signal on each twisted pair entirely separately, and to assume that crosstalk is simply additive Gaussian noise of which nothing is known. With this approach, subscribers can enjoy relatively high-speed service, far faster than voice-band modems, up to multiple Megabits per second ("Mbps"). This is the current static approach to DSL spectrum management.

As time progresses it is expected that there will be many more DSL users each demanding higher speed service. This will result in more crosstalk and higher-bandwidth services that are more vulnerable to crosstalk. Without accurate systems and methods for identifying crosstalk, canceling such crosstalk and thereby carefully managing the available FIG. 8 shows currently adopted power spectral density ("PSD") templates for each of these spectrum management classes except Class 6 with line 110 representing Class 1 and line 180 representing Class 9 with the others represented respectively in between. To comply with the ANSI standard, the PSD of the signal transmitted by a piece of equipment must fall under the template at all frequencies. This will generally be verified during manufacture, but if problems arise in the field the local operator will need to resolve incompatibilities and complaints, possibly including identification of systems that are transmitting in violation of the standard. These rules do not take into account the individual types of crosstalk sources or crosstalk couplings related to a particular pair in a cable, which may be considerably different than the near worst-case couplings that are assumed in the ANSI standard. Current techniques for DSL spectrum management assume static worst case crosstalk types and crosstalk couplings. Dynamic spectrum management would take into account the individual types of crosstalk sources and crosstalk couplings of each particular cable, and could greatly increase the number of customers that can be provided DSL service and their bit rates. Thus, a system that can characterize crosstalk on a loop-by-loop basis has the potential to yield a much more granular crosstalk characterization of the plant. Furthermore, the use of such crosstalk data in a loop spectrum management database, in turn has the potential to be mined, correlated and exploited to provide more optimal performances for individual subscriber loops.

It would be desirable to have a technique that could characterize the crosstalk environment on a loop-by-loop basis, in a mechanized and highly accurate manner without the need for special equipment or intervention at the subscriber's location.

Further it would be desirable to use the automated system for the identification in a spectrum management system for the spectral management of a DSL system.

Therefore, it is desirable to have a means for identifying crosstalk between local loops that will enable a system operator to identify actual or potential crosstalk disturbers depending on the configuration of the DSL services being provided to a plurality of customers.

SUMMARY

In accordance with the present invention a method and system for the identification of crosstalk in high-bandwidth DSL systems are used to ensure spectral compatibility between a number of DSL lines/subscribers in a loop plant providing a means for spectrum management in a local loop plant.

A novel method for crosstalk identification in the frequency domain computes the correlation coefficient between the measured spectrum and a set of pre-defined PSDs that may be viewed as a crosstalk "basis set".

In the method of the present invention the measured power spectral density of a subscriber loop is correlated with a predetermined set of power spectral densities for a group of possible crosstalk disturbers and the crosstalk disturber having the most closely correlated power spectral density is selected as the identified disturber. Once identified, the power spectral density for the selected crosstalk disturber is subtracted from the measured power spectral density of said subscriber loop using spectral subtraction and the resulting power spectral density is again correlated with the predetermined set of power spectral densities for the group of possible crosstalk disturbers to identify additional disturbers.

The identity of crosstalk disturbers can also be sent to an Operations Support System (OSS) for the management of the broadband spectrum available for a plurality of subscriber loops. The information could also be used to cancel the effect of the crosstalk disturber in a DSL receiver.

DETAILED DESCRIPTION

Figure 1:
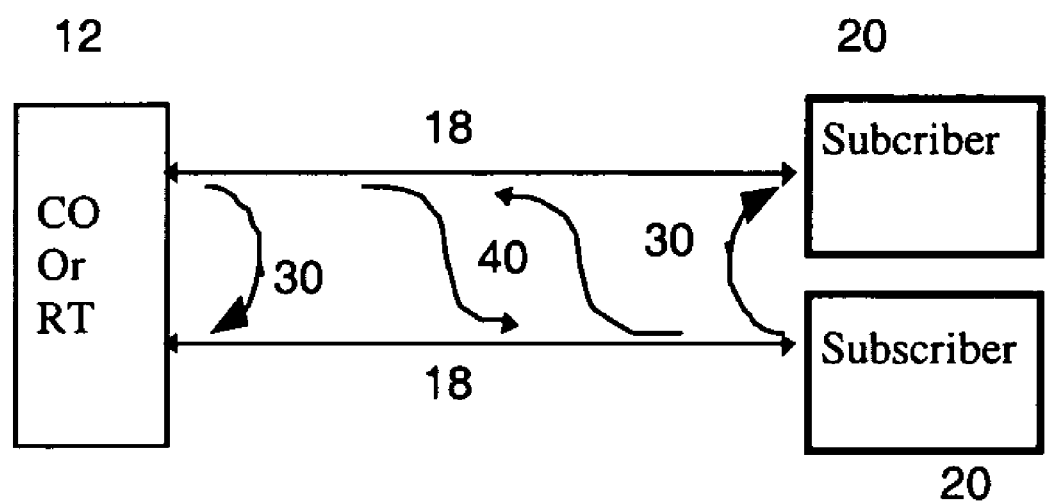
FIG. 1 depicts a DSL subscriber loop system having two DSL subscriber loops connecting to a central office.

FIG. 1 depicts crosstalk in an example of a local loop environment. DSL loops 18 comprising twisted pair copper wire connect two subscribers 20 to a central office ("CO") 12 or remote terminal ("RT"). Near-end crosstalk ("NEXT") 30 between the two loops may be present at the end of loops where the disturber's transmitter is located (either at the CO or the RT) while far-end crosstalk ("FEXT") 40 may be present at the end of the loop 18 opposite to where the disturber's transmitter is located.

Twisted-pair wire 18 can be considered a multi-user channel by expressing the received signal vector as $$Y(f)=R(f)+N(f)+H(f)D(f) \tag{1}$$

where R(f) is the received message vector, N(f) is the vector of independent background noise, D(f) is the vector of transmitted signals creating crosstalk on nearby pairs, and H(f) is the matrix of crosstalk couplings. In the case of near-end crosstalk (NEXT), R(f) is transmitted from one end of the cable and D(f) is transmitted from the other end. The received crosstalk H(f)D(f) can be canceled, minimized or otherwise treated so as to be less interfering than white noise.

The twisted-pair multi-user channel is generally time invariant. Crosstalk couplings may vary as the temperature of the cable changes, but only very slightly. The crosstalk sources may turn on and off, but not very often because the main application of broadband service is "always on" Internet access. Time invariance allows the possibility of very accurate estimates of crosstalk coupling using large sample sizes. Joint statistics can be obtained by a "third-party" operating a third party system, which is connected to all lines through communications links to the modems, and the knowledge of all the transmitted data could be used to estimate the crosstalk couplings. A "third-party" or operations center having access to multi-user crosstalk statistics would be far more capable of diagnosing crosstalk problems than an uninformed technician.

Received crosstalk can be measured by temporarily connecting measurement equipment to a single pair while crosstalk couplings could be measured by connecting measurement equipment to multiple pairs. The accuracy of estimates depends strongly on which elements of the multi-pair cable may be accessed, for example crosstalk couplings can be estimated accurately by accessing data from both transmitters and receivers. Crosstalk parameter estimation can be performed off-line using very many samples of data. Knowledge of crosstalk parameters can be useful for spectrum management and maintenance purposes and can also be used at run time to enhance modem performance.

There are many vagaries in the telephone outside plant, some older cables have poor crosstalk performance. Unanticipated problems from crosstalk are likely to occur and may be extremely difficult to diagnose.

The method of the present invention can be performed in any single receiver. The first step is identification of the type of DSL line that is generating the crosstalk. To accomplish this a receiver estimates which varieties of DSL are generating crosstalk. This can be accomplished because there is actually a small number of common crosstalker types at high frequencies: T1 lines, integrated services digital subscriber lines (ISDN), high bit-rate digital subscriber lines (HDSL), single-pair high bit-rate digital subscriber lines (HDSL2), asymmetric digital subscriber lines (ADSL), and symmetric digital subscriber lines (SDSL). G.shdsl and very-high rate digital subscriber lines (VDSL) are likely to be added to this list soon. Each of these crosstalker types has a unique crosstalk power spectral density (PSD), and this PSD is estimated with classic matched-filter correlation techniques. The basic implementation of the method is described by steps 310, 320 and 330 of FIG. 11, which also shows the additional steps in the iterative process described below.

Figure 2:
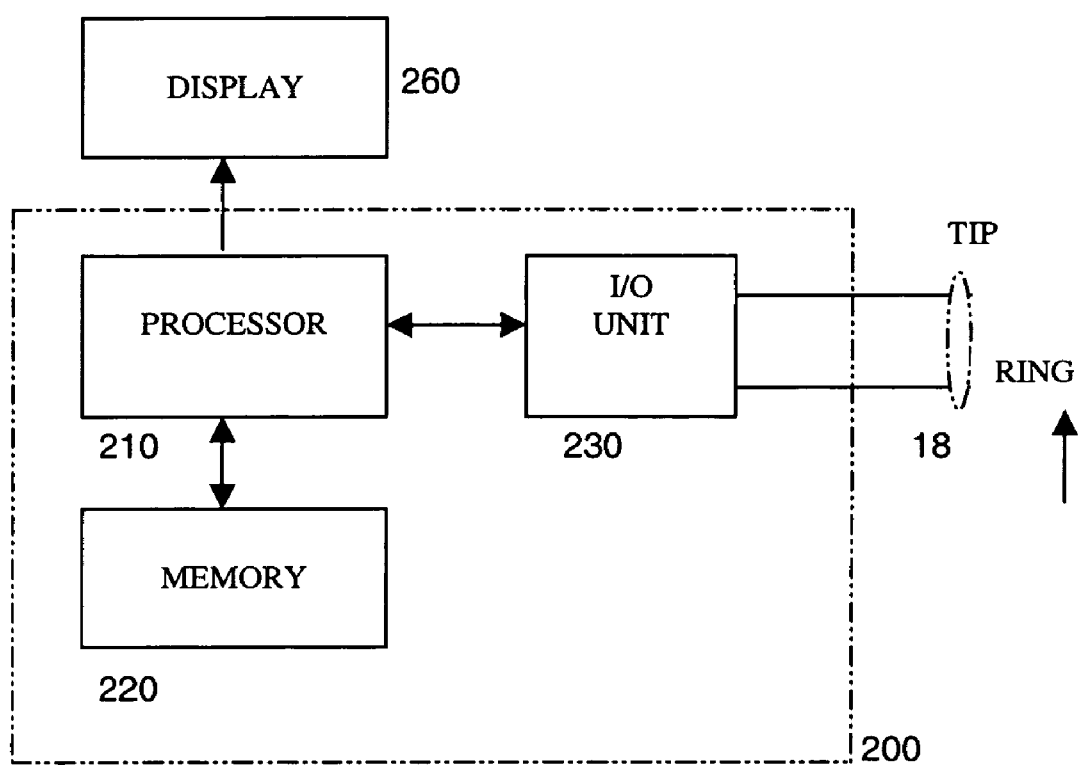
FIG. 2 depicts an illustrative embodiment of a crosstalk identification system according to the present invention.

Referring to FIG. 2, a crosstalk identification system according to the present invention provides for a computer 200 having a processor 210 in communication with a memory 220 (which can comprise either primary memory, such as RAM, or secondary memory, such as a magnetic disk drive or other storage media or a combination thereof) and input/output (I/O) unit 230. I/O unit 230 is adapted to receive data indicative of the power spectral density of one or more subscriber loops 18. Display 260 may be used to display graphical and/or textual information related to the PSD measurements and crosstalk identification. Other input/output devices (not shown) may be used in conjunction with the computer 200 such as a keyboard, mouse, touchpad, trackball etc. in order to provide a user interface.

Processor 210 executes the method steps described herein as stored in memory 220 in order to identify the crosstalk on one or more subscriber lines 18. Additional software may also be executed to generate the PSD from the measurements input through I/O unit 230. Alternatively, a separate test measurement device capable of measuring the PSD for the various subscriber loops may be attached to I/O unit 230.

The identification algorithm is extended to the case of multiple crosstalkers by a process of successive estimation and cancellation using spectral subtraction described in greater detail below.

Knowledge of the type of crosstalkers could be used for crosstalk cancellation in a DSL receiver. Once the type of the crosstalk source is determined, then the correlations of the source of the crosstalk are known, assuming correct decisions. These correlations are used to construct an optimal set of weightings for a type of predictive filtering that minimizes the received crosstalk power before detection in the receiver. The coefficients of the predictive filter are predetermined based on the known properties of each of the types of crosstalk.

Figure 3:
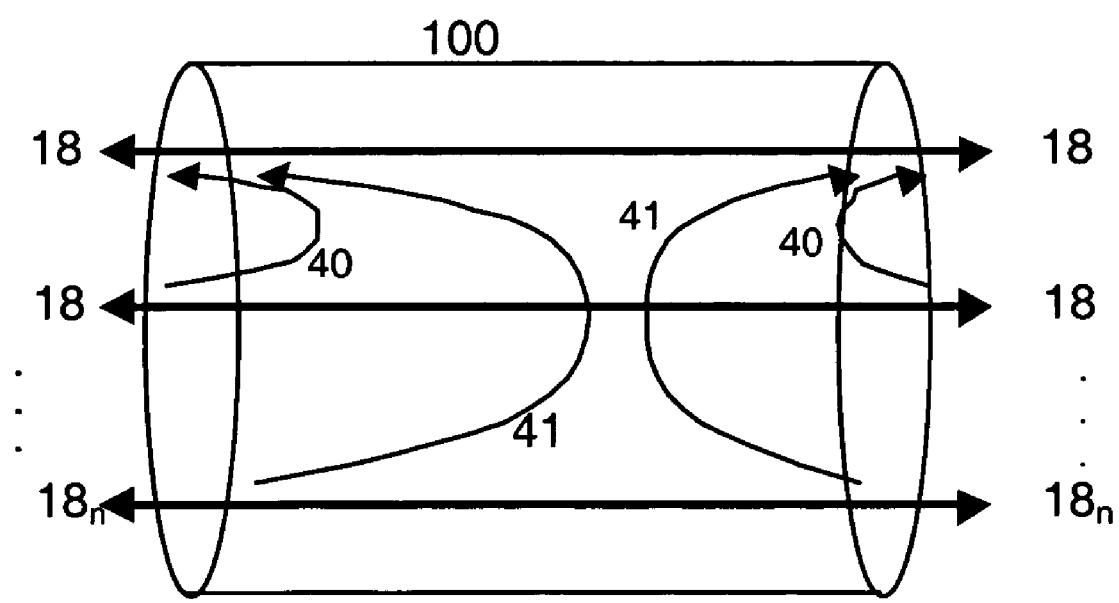
FIG. 3 depicts a cable binder having N twisted pairs of copper wire.

Sources of crosstalk are often called "disturbers." There are two types of crosstalk: near-end crosstalk (NEXT) and far-end crosstalk (FEXT). NEXT is more powerful than FEXT, particularly below about 1 MHz where many DSLs use overlapping spectra. If there is one crosstalker, then the received crosstalk PSD is the product of a PSD transmitted on a nearby pair times the crosstalk coupling transfer function. With multiple crosstalkers the received crosstalk PSD is the linear sum of each component. FIG. 3 depicts a cable binder 100 having N twisted pairs of copper wire 18. Lines 40 of FIG. 3 represent the NEXT between the first two twisted pairs of copper wire 18 while lines 41 represent the NEXT between the first and last pairs of copper wire 18.

Figure 4:
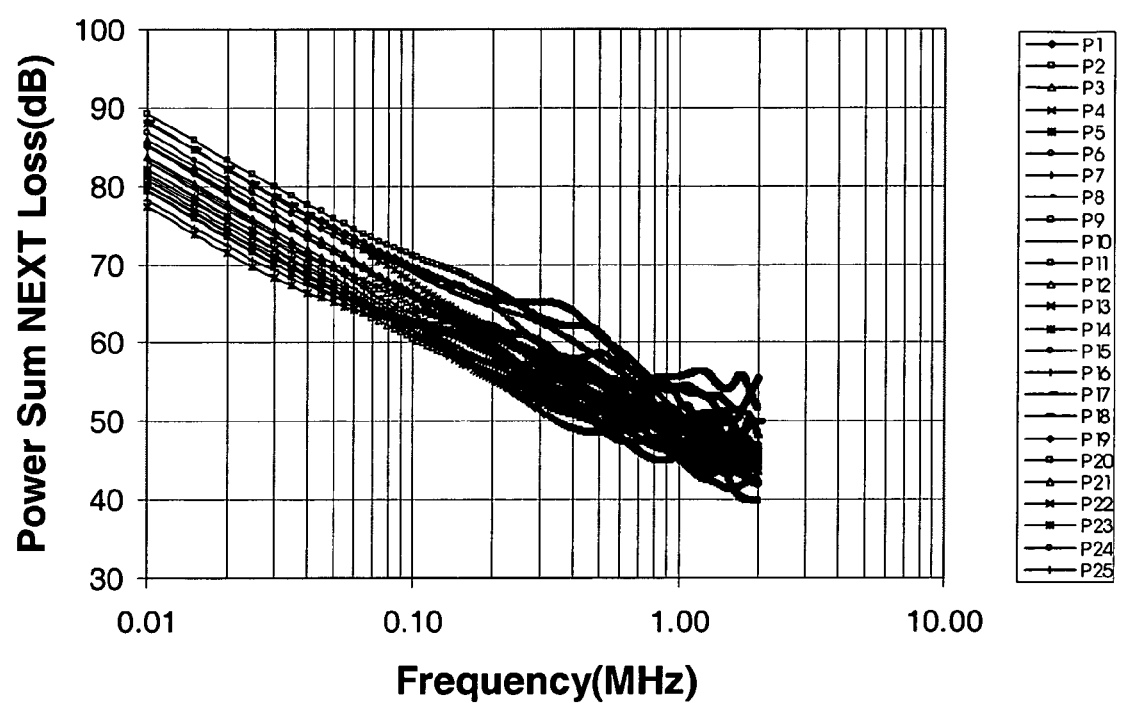
FIG. 4 depicts the power sum of NEXT loss in dB for a binder having 25 twisted pairs of copper wire.

Crosstalk can be characterized in terms of power-sums. For a given pair in a binder group, the power-sum NEXT is formed from the sum of the pair-to-pair NEXT coupling powers of the other pairs in the binder group into this given pair. For a typical 25-pair binder group, the 25 power sums are shown in FIG. 4. The power-sum is usually displayed as a power-sum "loss" and the lower the loss the higher the NEXT coupling. The NEXT power-sum loss is approximately linear with frequency on the log-log scale. The NEXT model often used for studies in the industry is stated as expected 1% worst case power-sum crosstalk loss as a function of frequency. This means that on average, 1% of the pairs tested are subjected to power-sum crosstalk loss less than that assumed by the model at the given frequency. Such a model is a smooth curve versus frequency, in which the loss decreases at about 15 dB per decade of frequency. This statistical model ensures that the 1% worst case NEXT power sum level follows the curve over frequency but this noise level may appear on different pairs at different frequencies. The 24-disturber NEXT power level for one specific pair is not a smooth curve if plotted over frequency and the deviation from the statistical model increases as the number of interferers used in the power sum is reduced. The power-sum loss for less than a full binder group depends on the distribution of the pairs on which the crosstalking signal appears.

Figure 5:
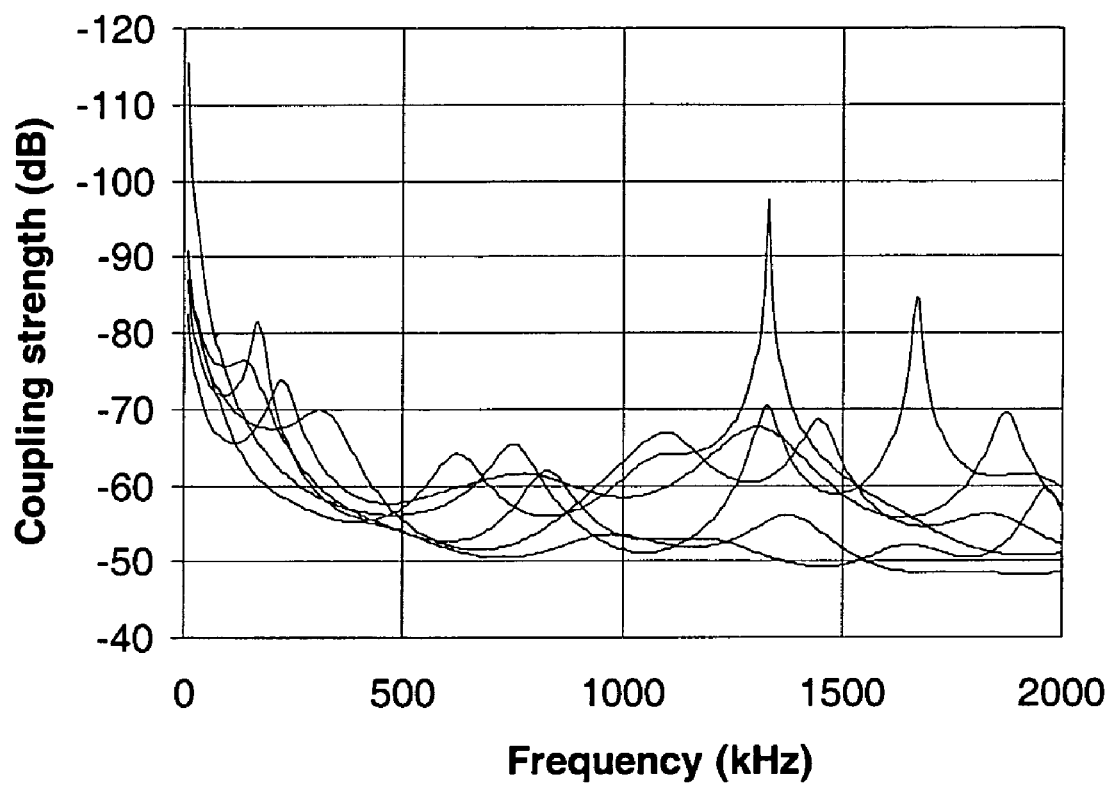
FIG. 5 depicts examples of measured pair-to-pair NEXT loss.

For a 25-pair binder group there are 300 distinct pair-to-pair couplings (assuming symmetry). Examples of six measured pair-to-pair NEXT couplings from a binder group of twisted pair wires 18 are depicted in FIG. 5. It should be noted that there is wide variation of coupling strength for each pair-to-pair combination with frequency. The power summing process smoothes and averages some of this variation.

The received signal on pair number k can be expressed as $$Y_k(f) = R_k(f) + N_k(f) + \sum_{i=1, i \neq k}^{N} H_{ik}(f) D_i(f) \quad (2)$$

where $R_k(f)$ is the received message signal, $N_k(f)$ is independent background noise, $D_i(f)$ is the signal transmitted on pair i, $H_{ik}(f)$ is the crosstalk coupling between pair i and pair k, and the crosstalk received on pair k from a system transmitting on pair i is $H_{ik}(f)D_i(f)$. Crosstalk has a number of elements which may be identified or estimated: the crosstalk coupling $H_{jk}(f)$ between each pair, the crosstalkers' transmitted spectrum $D_i(f)$, sequences of sampled received crosstalk, etc. DSL modems can measure crosstalk samples. Assuming correct decisions, the received sampled sum of crosstalk and noise is easily obtained in each receiver by subtracting $R_k(f)=R_k(f)$ from $Y_k(f)$. These samples and their statistics can be exploited to improve the performance of the receiver. Often a process of successive estimation and cancellation is performed where the most powerful crosstalk disturber is first estimated and subtracted, then the next most powerful and so on.

If crosstalk is measured while a DSL system is running, what is measured or estimated is the crosstalk in the bandwidth of the considered DSL system. For this reason, other DSL services running on adjacent pairs may not be detected if their bandwidth is not significantly overlapping, with the bandwidth of the disturbed system. A typical example would be ISDN crosstalk into non-overlapped downstream ADSL. If this is the case, there is no performance degradation for the considered DSL service but, from a spectrum management point of view, it may be important to have an accurate map of all the services that generate crosstalk into a given pair. Moreover, it may also be important to identify the services that are generating crosstalk on a pair that may not even be carrying DSL services. An accurate map of all the services that generate crosstalk into a given pair is an impossible goal to achieve via modem-based methods of system identification if the considered pair is not in use. The only way to achieve such a complete description of the crosstalkers regardless of the availability of a sequence of observations, is to perform a preliminary PSD measurement, e.g. via a spectrum analyzer or a selective voltage meter.

An important aspect of the crosstalk identification algorithm is a calculation of crosstalk correlation in the frequency domain. The correlation receiver is known to be an optimum detector in the case of equally likely transmitted signals with known waveforms transmitted over an AWGN channel. It is mathematically equivalent to the matched-filter receiver which can be shown to maximize the output signal to noise ratio by using Schwarz's inequality. The basic structure of a correlation receiver is used here, except that it is adapted with known transmitted signals but unknown crosstalk couplings The correlation coefficient $\rho_{X,Y}$ between two data arrays $X=\{x_1, \ldots, x_N\}$ and $Y=\{y_1, \ldots, y_N\}$ with standard deviations $\sigma_X$ and $\sigma_Y$ and means $\mu_X$ and $\mu_Y$, is defined as $$\rho_{X,Y} = \frac{Cov(X, y)}{\sigma_X \cdot \sigma_Y}, \quad (3)$$

where $Cov(X, Y) = \frac{1}{N}\sum_{j=1}^{N}(x_j - \mu_X)\cdot(y_j - u_Y)$ and $-1 \le \rho_{XY} \le 1.$ The correlation coefficient is a measure of how well the two data sets move together (positive values) or move apart from one another (negative values).

Figure 6:
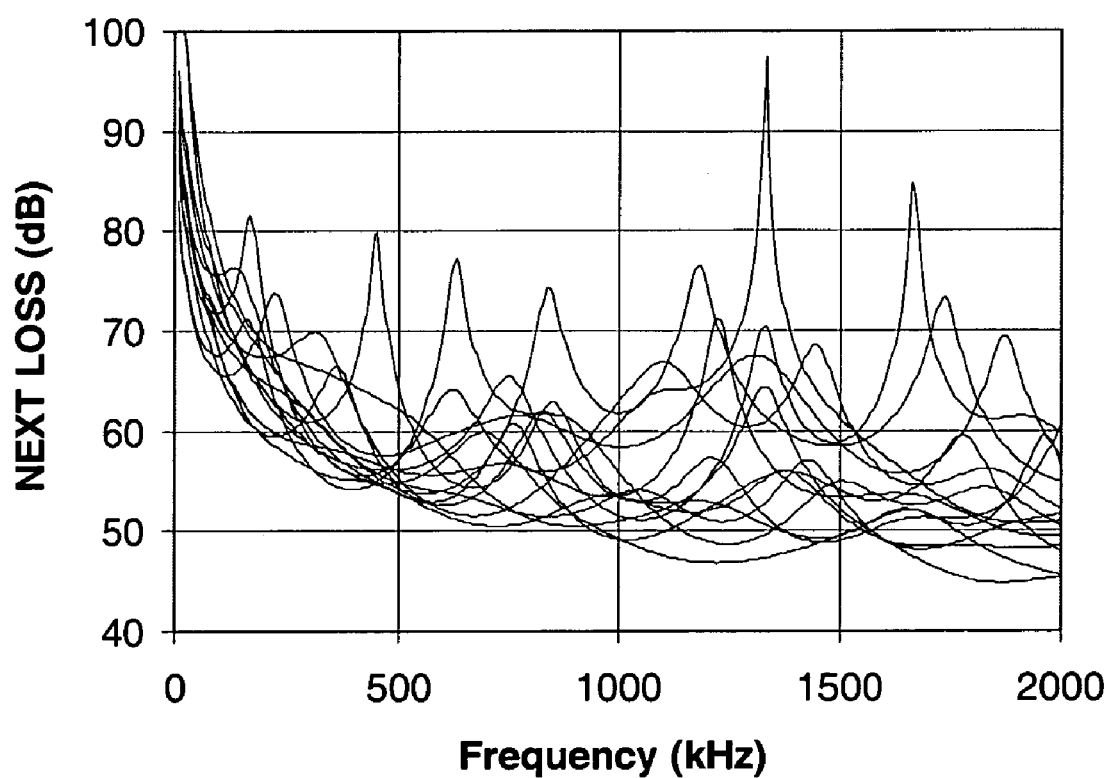
FIG. 6 depicts an example of a fourteen member canonical set of pair-to-pair NEXT couplings.
Figure 7:
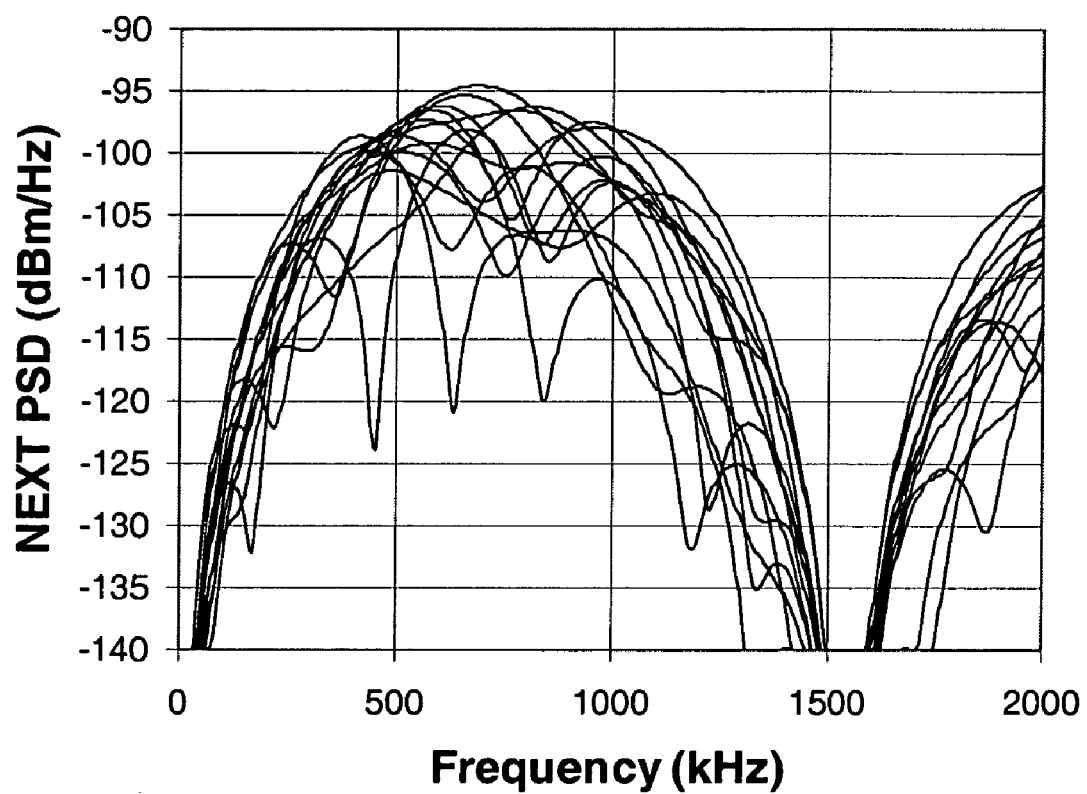
FIG. 7 depicts an example of a fourteen member basis set of T1 NEXT couplings.
Figure 8:
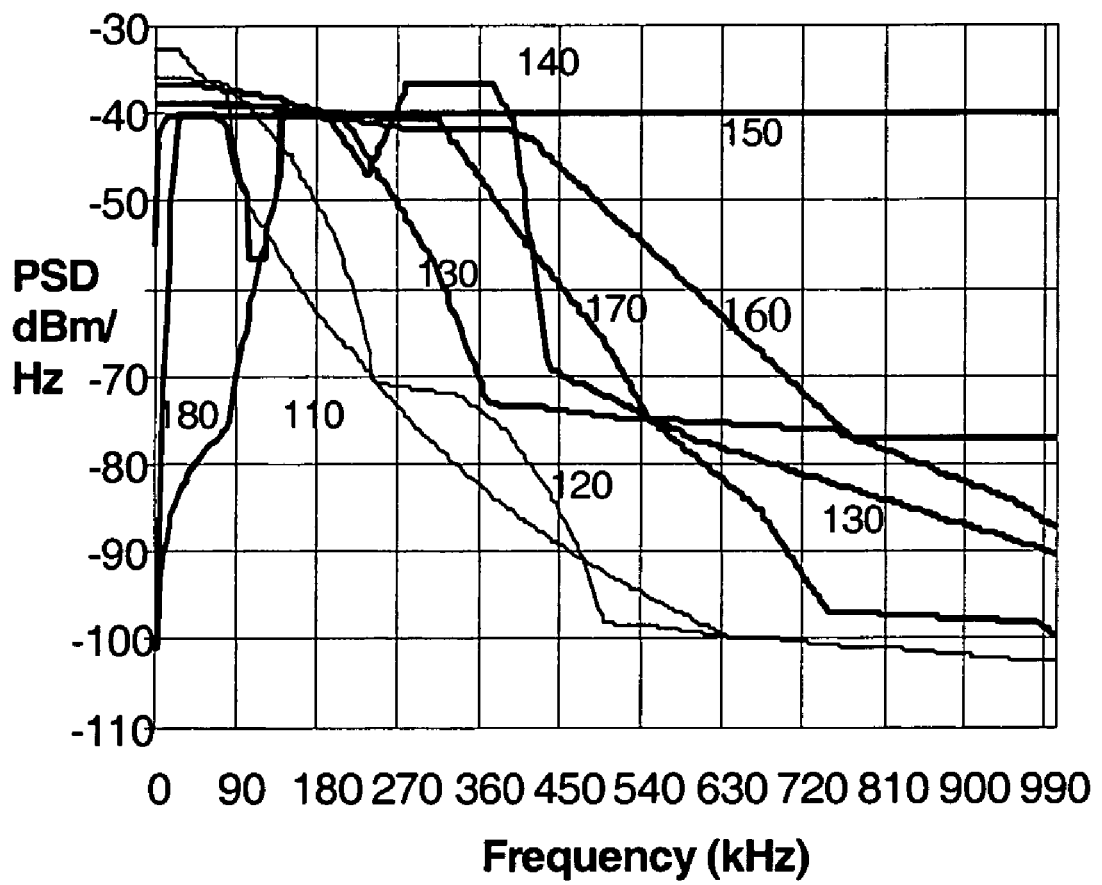
FIG. 8 depicts the power spectral density ("PSD") templates for each of the spectrum management classes.

The data array $Y=\{y_1, \ldots, y_N\}$ is the measured crosstalk power spectrum density (PSD) of the unknown DSL disturber. The data array $X=\{x_1, \ldots, x_N\}$ is a reference or basis crosstalk PSD profile caused by a known DSL disturber. Each basis set of crosstalk PSDs is generated from a single canonical set of measured strong pair-to-pair crosstalk couplings and a specific type of transmitted DSL PSD. Each type of transmitted DSL PSD is multiplied by all of the canonical crosstalk couplings to generate a basis set for that DSL. The assumption is that a member of this basis crosstalk set is highly correlated with any crosstalk that is strong enough to be troublesome or measurable. An example of a canonical set of pair-to-pair couplings is shown in FIG. 6. This canonical set comprises the fourteen out of 300 possible pair-to-pair NEXT couplings with the smallest crosstalk loss sum. The crosstalk loss sum is obtained by dB summing over 401 equally spaced frequency samples in the 10 kHz–2 MHz band. The basis set of T1 disturber NEXT PSDs for this example is shown in FIG. 7. Basis sets for ISDN, HDSL, ADSL, 2B1Q SDSL and HDSL2 can be generated easily for this example. Increasing the number of members belonging to the canonical set of crosstalk transfer functions would increase the accuracy of the identification algorithm. Another example of a canonical set of pair-to-pair couplings could be all 300 measured independent pair-to-pair couplings. A particularly useful NEXT basis set is found to comprise the ISDN, HDSL, ADSL, 2B1Q SDSL and HDSL2 NEXT sets that have power exceeding or equaling the 49$^{th}$ disturber power for a given DSL type obtained from the ANSI 1% NEXT model as defined in the Spectrum Management Standard, T1.417.

In the method of the present invention for the case of a single disturber, the measured crosstalk PSD is correlated as described in the last subsection with each of the basis PSDs, and the identification is simply the type of crosstalker which has the highest correlation. In the examples set forth herein, most common DSL types are simulated: ISDN Basic Rate Interface (BRI), HDSL, T1, ADSL, 400 kbps SDSL, 1040 kbps SDSL, 1552 kbps SDSL, and HDSL2. All transmit system PSDs are as defined in the Spectrum Management Standard, T1.417. ADSL and HDSL2 have different PSDs upstream and downstream.

Figure 9:
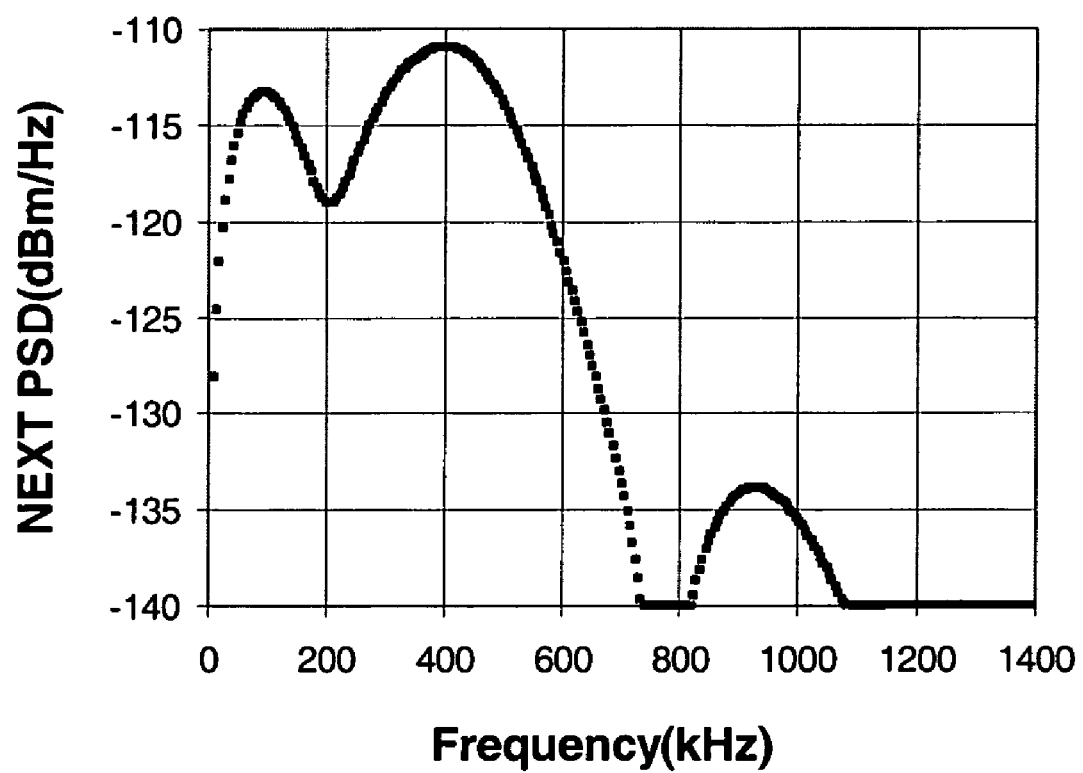
FIG. 9 depicts the NEXT PSD for a first unknown disturber.

An unknown disturber's NEXT PSD is shown in FIG. 9. The calculated correlation with each member of each DSL crosstalk basis set (for the example of a fourteen member canonical crosstalk coupling set) is given in Table 2 set forth below. The DSL with the highest correlation and thus the identity of the unknown disturber is correctly identified as 1552 kbps SDSL.

TABLE 2

| Basis Coupling | ISDN BRI | HDSL | T1 | ADSL Down | ADSL Up | SDSL 400 | SDSL 1040 | SDSL 1552 | HDSL2 Down | HDSL2 Up |
|---|---|---|---|---|---|---|---|---|---|---|
| 1 | 0.0324 | 0.1823 | 0.3225 | 0.1947 | 0.2427 | 0.3052 | 0.2976 | 0.7503 | 0.6244 | 0.0888 |
| 2 | 0.0257 | 0.2582 | 0.0009 | −0.1045 | 0.3102 | 0.2526 | 0.4596 | 0.9022 | 0.637 | 0.0861 |
| 3 | 0.0351 | 0.2094 | −0.0486 | −0.1852 | 0.2615 | 0.302 | 0.2132 | 0.4523 | 0.4871 | 0.1039 |

TABLE 2-continued

| Basis Coupling | ISDN BRI | HDSL | T1 | ADSL Down | ADSL Up | SDSL 400 | SDSL 1040 | SDSL 1552 | HDSL2 Down | HDSL2 Up |
|---|---|---|---|---|---|---|---|---|---|---|
| 4 | 0.0389 | 0.1989 | 0.2199 | 0.0722 | 0.2535 | 0.3036 | 0.2788 | 0.7056 | 0.6259 | 0.0946 |
| 5 | 0.0315 | 0.2136 | 0.0012 | −0.1415 | 0.2645 | 0.3008 | 0.4201 | 0.9124 | 0.6439 | 0.0899 |
| 6 | 0.0331 | 0.1907 | 0.1528 | −0.1465 | 0.2545 | 0.3044 | 0.3726 | 0.8638 | 0.637 | 0.0856 |
| 7 | 0.0297 | 0.2579 | −0.0507 | −0.0769 | 0.2833 | 0.2911 | 0.2906 | 0.7818 | 0.699 | 0.1378 |
| 8 | 0.0599 | 0.1617 | 0.396 | 0.0398 | 0.2301 | 0.3004 | 0.3241 | 0.8039 | 0.6282 | 0.0803 |
| 9 | 0.0259 | 0.3438 | 0.5703 | 0.5072 | 0.3035 | 0.2492 | 0.5109 | 0.8657 | 0.6328 | 0.1057 |
| 10 | 0.0273 | 0.3209 | 0.4956 | 0.3835 | 0.3055 | 0.2686 | 0.4642 | 0.9776 | 0.6718 | 0.3113 |
| 11 | 0.0309 | 0.2483 | 0.3381 | 0.3841 | 0.2787 | 0.2942 | 0.3842 | 0.9262 | 0.6589 | 0.1137 |
| 12 | 0.05 | 0.1763 | −0.2645 | −0.2905 | 0.2382 | 0.3009 | 0.2794 | 0.771 | 0.633 | 0.087 |
| 13 | 0.0258 | 0.3359 | 0.7741 | 0.2253 | 0.307 | 0.252 | 0.4791 | 0.8263 | 0.6286 | 0.1101 |
| 14 | 0.0281 | 0.2116 | −0.1477 | −0.2566 | 0.2768 | 0.293 | 0.2737 | 0.4701 | 0.5408 | 0.0912 |

Figure 10:
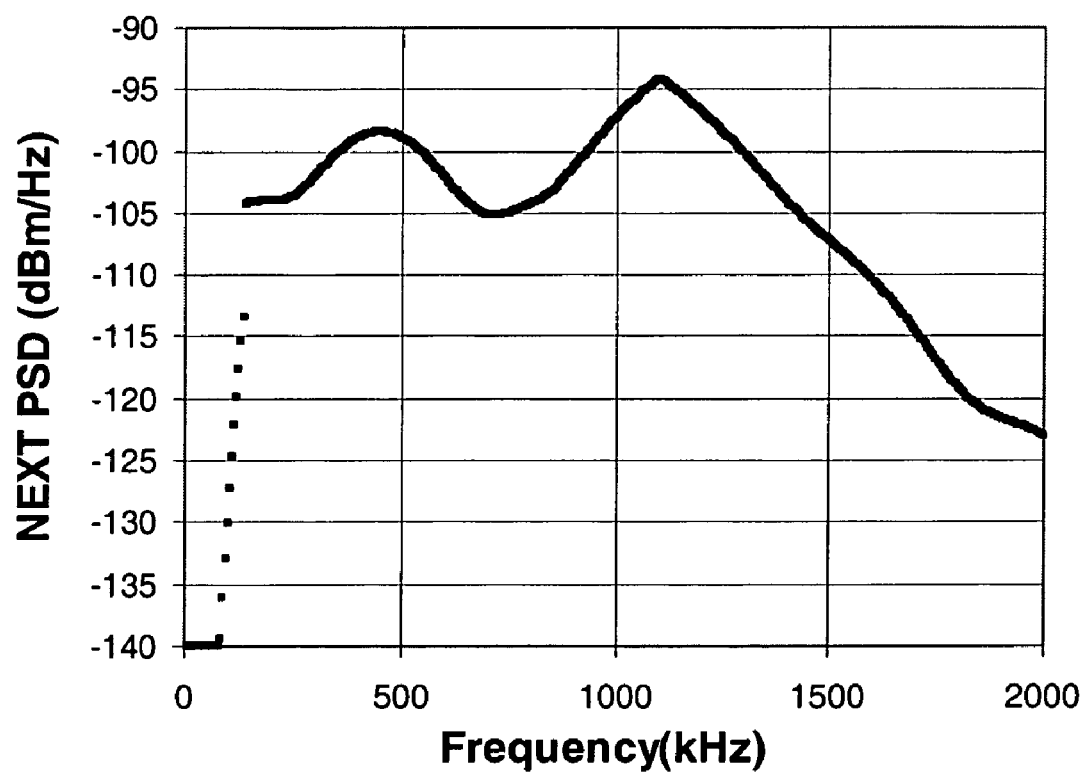
FIG. 10 depicts the NEXT PSD for a second unknown disturber.

Another unknown disturber's NEXT PSD is shown in FIG. 10. The calculated correlation with each member of each DSL crosstalk basis set (for the example of a fourteen member canonical crosstalk coupling set) is given in Table 3. The DSL with the highest correlation and thus the identity of this unknown disturber is correctly identified as downstream ADSL.

At step 325, the iteration counter is set at one and the estimated PSD of the received crosstalk is correlated at step 330 with the basis set to identify the first source of crosstalk, i.e., the one having the highest correlation in accordance with the procedure described above.

The onion-peeling technique used to identify additional crosstalk disturbers can be explained by focusing on the

TABLE 3

| Basis Coupling | ISDN BRI | HDSL | T1 | ADSL Down | ADSL Up | SDSL 400 | SDSL 1040 | SDSL 1552 | HDSL2 Down | HDSL2 Up |
|---|---|---|---|---|---|---|---|---|---|---|
| 1 | −0.1263 | −0.1531 | 0.1797 | 0.6762 | −0.1488 | −0.1932 | −0.1261 | 0.0157 | 0.0241 | −0.0991 |
| 2 | −0.1242 | −0.1854 | 0.0079 | 0.3648 | −0.2038 | −0.1926 | −0.0703 | 0.1312 | 0.0529 | −0.0818 |
| 3 | −0.1266 | −0.1688 | 0.313 | 0.7028 | −0.1603 | −0.1942 | −0.1581 | −0.0782 | −0.0807 | −0.1159 |
| 4 | −0.1261 | −0.1623 | 0.1296 | 0.4366 | −0.1548 | −0.1909 | −0.1397 | −0.0119 | 0.0125 | −0.1041 |
| 5 | −0.1252 | −0.1657 | 0.0506 | 0.4303 | −0.1632 | −0.1974 | −0.0994 | 0.1246 | 0.0505 | −0.093 |
| 6 | −0.1255 | −0.1552 | 0.6056 | 0.9228 | −0.1567 | −0.1965 | −0.1021 | 0.0863 | 0.0435 | −0.0914 |
| 7 | −0.1255 | −0.1927 | −0.0853 | −0.0648 | −0.1762 | −0.1981 | −0.181 | 0.082 | 0.0062 | −0.1382 |
| 8 | −0.1157 | −0.14 | 0.49 | 0.8042 | −0.14 | −0.1798 | −0.1017 | 0.0568 | 0.0363 | −0.0889 |
| 9 | −0.1249 | −0.2219 | 0.0936 | 0.1892 | −0.1996 | −0.1899 | −0.0778 | 0.1015 | 0.0512 | −0.0856 |
| 10 | −0.1253 | −0.2136 | 0.2077 | 0.523 | −0.1951 | −0.195 | −0.2051 | 0.0483 | 0.0358 | −0.2187 |
| 11 | −0.1255 | −0.1876 | 0.079 | 0.1361 | −0.1729 | −0.198 | −0.1518 | 0.0957 | 0.0408 | −0.1155 |
| 12 | −0.1182 | −0.1504 | 0.0243 | 0.4099 | −0.1452 | −0.1816 | −0.1273 | 0.0269 | 0.0238 | −0.0989 |
| 13 | −0.125 | −0.2314 | 0.5101 | 0.954 | −0.2014 | −0.1916 | −0.112 | 0.0639 | 0.0423 | −0.0944 |
| 14 | −0.1255 | −0.1746 | 0.0932 | 0.5948 | −0.1732 | −0.2015 | −0.1389 | −0.0766 | −0.0091 | −0.0984 |

In realistic cases it has been found that the DSL type of a single disturber is identified correctly nearly every time.

The case of mixed crosstalk arises when at least two different services are present in a binder. If the measured crosstalk PSD consists of the contribution of different kinds of disturbers, the identification algorithm described above would not identify the whole set of crosstalkers all at once but would identify the strongest candidate only.

Figure 11:
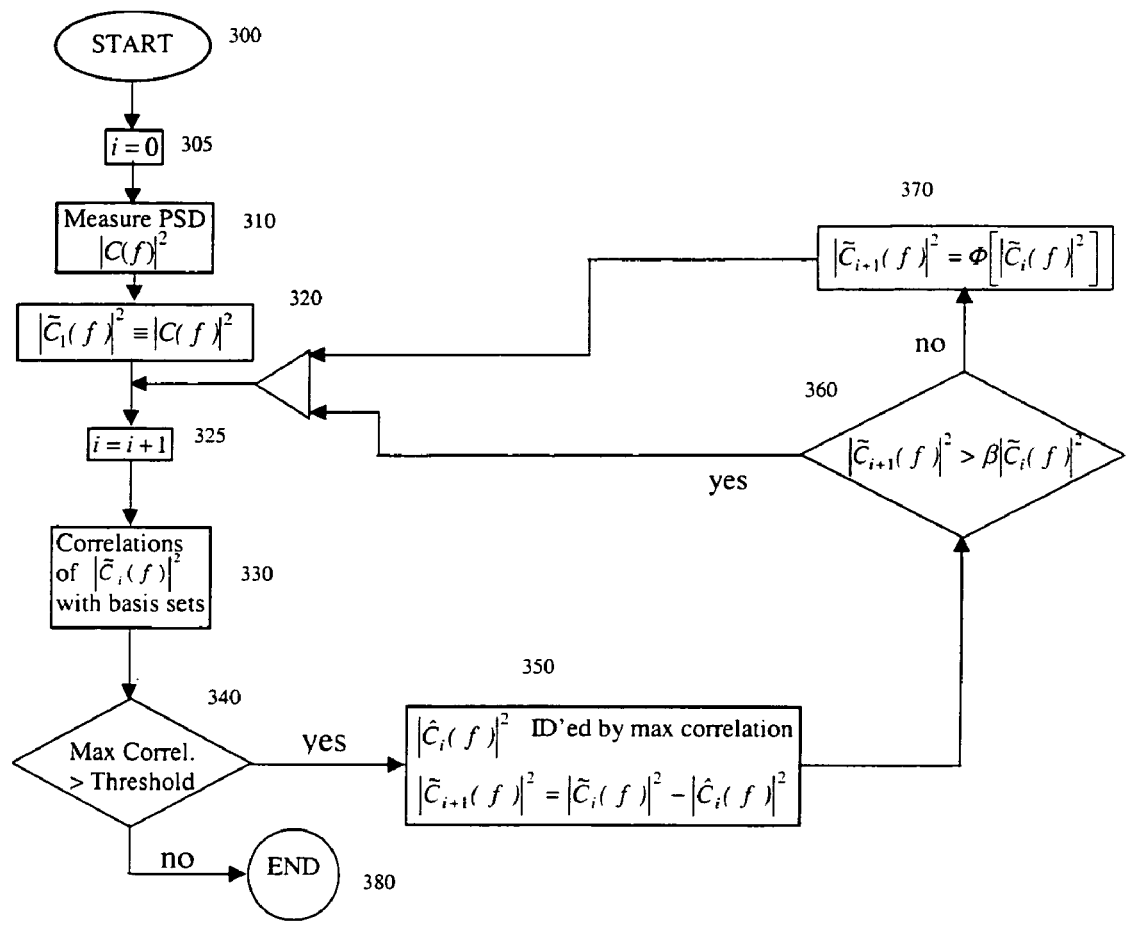
FIG. 11 is a flow diagram of the crosstalk identification and subtraction algorithms of the present invention.

In order to overcome this limitation in cases of mixed crosstalk, the method of the present invention uses a frequency-domain onion peeling technique based on spectral subtraction methods as set forth in FIG. 11. Spectral subtraction is a method originally proposed in speech and music processing for the restoration of the power spectrum of a signal observed in additive noise through subtraction of an estimate of the average noise spectrum from the noisy signal spectrum.

At the start 300 of the method the iteration counter is set to zero 305 and at step 310 a measurement of the PSD of a subscriber loop 18 is taken. Next at step 320 the first estimated PSD is set to the measured PSD as set forth below:

$$|C_1(f)|^2 = |C(f)|^2 \qquad (4)$$

crosstalk received on a single pair. The subscript k in equation (2) is dropped and $y(m)=r(m)+n(m)+\Sigma_i h_i(m) d_i(m)$ is the noisy received signal in the sampled-time domain, where $r(m)$ is the received message signal, $n(m)$ is additive background noise, and $y(m)$ is the noisy observation, respectively. To simplify further, define each crosstalk component as $c_i(m)=h_i(m)d_i(m)$ so that the composite received crosstalk is $c(m)=\Sigma_i c_i(m)=\Sigma_i h_i(m)d_i(m)$. Then ignoring the background noise and transforming to the frequency domain, $Y(f)=R(f)+C(f)$. Power spectrum subtraction is defined as in the following:

$$|R(f)|^2 = |Y(f)|^2 - \overline{|C(f)|^2} \qquad (5)$$

where $|R(f)|^2$ is an estimate of the signal PSD, $|Y(f)|^2$ is the instantaneous PSD of the noisy observation, and $\overline{?C(f)?^2}$ the time-veraged noise spectra. The basic assumption is that the noise is a slowly varying process so that averaging would not smear the noise spectrum.

Let $c(m)=c_1(m)+c_2(m)$ be a composite crosstalk constituted of two crosstalk terms pertaining to two different DSL systems. Assuming that the identification algorithm (described above) identifies the strongest disturber that generated crosstalk $c_1(m)$, an estimate of its PSD $|\hat{C}_1(f)|^2$ can be obtained. At step 340 a decision is made as to whether the maximum correlation is greater than a set threshold. If it is not, then the algorithm has identified all of the crosstalk components. If it is, the identified component must be subtracted for further processing. Basically, the composite crosstalk c(m) can be viewed as a noisy observation of the useful signal $c_2(m)$ embedded in the noise $c_1(m)$. Because the output of the crosstalk identification algorithm is a true PSD obtained on the basis of a PSD mask and an estimated pair-to-pair coupling function, there is no need to perform an averaging operation on the estimated PSD of the strongest crosstalker (noise) $|\hat{C}_1(f)|^2$. Moreover, the instantaneous PSD of the noisy observation $|Y(f)|^2$ (necessary in the original formulation of the problem because of the non-stationary nature of speech and music signals) can be replaced in our case by the measured PSD $|C(f)|^2$. Therefore, the power spectrum subtraction for crosstalk identification can be defined as $$|\tilde{C}_2(f)|^2 = |C(f)|^2 - |\hat{\imath}t\hat{a}tC\hat{m}\hat{e}d_1(f)|^2, \quad (6)$$

yielding the residual PSD $|\tilde{C}_2(f)|^2$ at step 350 of FIG. 11.

Due to the great variations in the pair-to-pair coupling functions, spectral subtraction can result in negative estimates of the power spectrum. Power spectra are non-negative functions of frequency, and any negative estimate of these variables should be mapped into a non-negative value. To avoid negative estimates, the power spectrum is post processed in steps 360 and 370 using a mapping function T[ ] of the form:

$$T\left[|\tilde{C}_2(f)|^2\right] = \begin{cases} |\tilde{C}_2(f)|^2, & \text{if } |\tilde{C}_2(f)|^2 > \beta|C(f)|^2 \\ \Phi[|C(f)|^2], & \text{otherwise} \end{cases} \quad (7)$$

Empirically a good value of β ranged from approximately 0.0 to approximately 0.1. The simplest choice for the function Φ[·] is Φ[|C(f)|²]=noise floor=−140 dBm/Hz. Another possible choice could be Φ[|C(f)|²]=β|C(f)|².

A flow chart for implementing the crosstalk identification algorithm is given in FIG. 11. The residual PSD $|\tilde{C}_2(f)|^2$ is fed to the crosstalk identification algorithm that is now able to unveil the nature of the second disturber and estimate its PSD $|\hat{C}_2(f)|^2$. Steps 325 and 330 are reiterated until all disturbers are identified, i.e., the iteration ceases at step 380 when the maximum correlation is less than or equal to the threshold at step 340. It has been found by simulations that overall accuracy is enhanced by retaining and using identified crosstalkers only if the maximum crosstalk correlation is greater than a certain threshold that is empirically determined. The threshold is preferably between approximately 0.7 and 0.99 and is more preferably approximately 0.9. An example of the technique follows.

Figure 12:
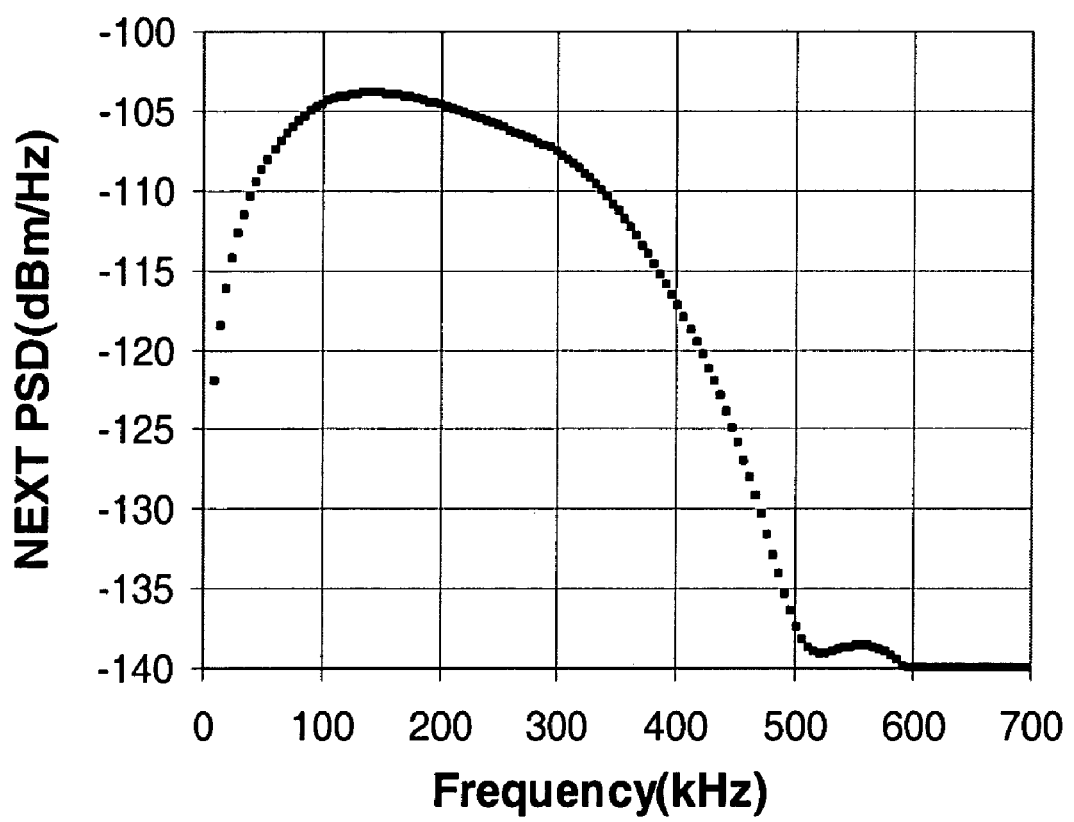
FIG. 12 is a diagram depicting measured mixed crosstalk containing a mixture of crosstalk from SDSL @1040 kbps and HDSL.

Consider the measured mixed crosstalk given in FIG. 12 that happens to be a mixture of crosstalk from SDSL @1040 kbps and HDSL. The crosstalk identification algorithm yields the results given in Table 4.

TABLE 4

| Iteration | NEXT Power(dBm) | Max Correlation | DSL Type | Coupling # |
|---|---|---|---|---|
| 1 | −50.6 | 0.9719 | 1040 kbps SDSL | 7 |

TABLE 4-continued

| Iteration | NEXT Power(dBm) | Max Correlation | DSL Type | Coupling # |
|---|---|---|---|---|
| 2 | −51.8 | 0.9235 | HDSL | 11 |
| 3 | −54.0 | <0.90 | None | |

The crosstalk identification method of the present invention as set forth in FIG. 11 first identifies the strongest disturber as SDSL @1040 kbps. On the next iteration it identifies HDSL as the second strongest disturber. Finally on the third iteration, the maximum correlation of the remainder NEXT is less than 0.90, the set threshold.

The use of spectral subtraction may cause deterioration in the quality and the information content of the residual crosstalk PSD. In the literature, there are a number of variants of spectral subtraction that aim to provide consistent performance improvement across a range of SNRs.

The spectral subtraction equation can be expressed as the product of the noisy signal spectrum and the frequency response of a spectral subtraction filter as:

$$|R(f)|^2 = |Y(f)|^2 - \overline{|C(f)|^2} = H(f)|Y(f)|^2 \quad (8)$$

where the frequency response of the spectral subtraction filter is defined as:

$$H(f) = 1 - \frac{\overline{|C(f)|^2}}{|Y(f)|^2} \quad (9)$$

The spectral subtraction filter H(f) is a zero-phase filter, with its magnitude response in the range 0≦H(f)≦1. The filter acts as an SNR-dependent attenuator. The attenuation at each frequency increases with the decreasing SNR, and conversely decreases with increasing SNR.

The least mean squared error linear filter for noise removal is the Wiener filter. The implementation of the Wiener filter requires the power spectra (or equivalently the correlation functions) of the signal and the noise process. The Wiener filter is based on ensemble average spectra of the signal and the noise, and the averaging operations are taken across the ensemble of different realizations of the signal and noise processes. On the other hand, the spectral subtraction filter, uses instantaneous spectra of the noisy observation and the time averaged spectra of the noise. This is necessary since in spectral subtraction only one realization of the noise process is available.

Spectral subtraction is computationally efficient because it only requires an estimate of the noise power spectrum. Because it does not utilize the statistics of the signal process, however, it may use too little a priori information. However, for an ergodic process, the time-averaged spectrum approaches the ensemble averaged spectrum, so that the spectral subtraction filter asymptotically approaches the Wiener filter. This property does not hold when processing speech and music signals because they are intrinsically non-stationary (and, therefore, non-ergodic). When spectral subtraction is applied to the present case of crosstalk identification, however, the quantities involved are true PSDs and not instantaneous or time-averaged ones. Therefore, the implementation of spectral subtraction may be viewed as a sort of optimal Wiener filtering. This interpretation may explain why spectral subtraction seems to perform very well when applied to successive crosstalk identification. The major limitation encountered is the non-linear processing distortion due to the necessity of mapping negative values into non-negative values. This distortion increases at every iteration when equation (7) is implemented and limits the accuracy of the method to the identification of up to a small number of different crosstalker types. From a practical point of view, this does not look as a major limitation because it is very unlikely that more than a few interferers cause performance degradation in DSL systems.

The method and apparatus of the present invention can be applied independently to any DSL line to identify crosstalk for spectrum management purposes. It could also be embedded into any single receiver. The method has been found to be very accurate in identifying a single crosstalk disturber type and multiple disturber types. It may also form part of a receiver structure that exploits knowledge of DSL disturber type to perform crosstalk cancellation.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for identifying the source of crosstalk disturbance in a subscriber loop comprising the steps of:
   measuring the power spectral density of the noise present on a subscriber loop;
   correlating the power spectral density for said subscriber loop with a predetermined set of power spectral densities for a group of possible crosstalk disturbers;
   selecting the crosstalk disturber having the most closely correlated power spectral density;
   subtracting the power spectral density for the selected crosstalk disturber from the measured power spectral density of said subscriber loop using spectral subtraction to generate a residual power spectral density;
   correlating the residual power spectral density with the predetermined set of power spectral densities for the group of possible crosstalk disturbers; and,
   selecting the crosstalk disturber having the most closely correlated power spectral density.

2. The method of claim 1 wherein the steps of subtracting, correlating and selecting are iteratively performed until the correlation coefficient for the most closely correlated power spectral density falls below a predetermined correlation threshold.

3. The method of claim 2 wherein the predetermined correlation threshold is between approximately 0.7 to approximately 0.99.

4. The method of claim 2 wherein the predetermined correlation threshold is approximately 0.9.

5. The method of claim 1 wherein negative power spectrum densities resulting from said subtracting step are mapped into a non-negative value.

6. The method of claim 5 wherein the mapping function, T, is defined as:

$$T[|\tilde{C}_{i+1}(f)|^2] = \begin{cases} |\tilde{C}_{i+1}(f)|^2, & \text{if } |\tilde{C}_{i+1}(f)|^2 > \beta|C_i(f)|^2 \\ \Phi[|C_i(f)|^2], & \text{otherwise} \end{cases}$$

wherein $|C_{i+1}(f)|^2$ is the residual power spectral density and $\Phi[|C_i(f)|^2]$ is a non-negative function equal to a pre-determined noise floor.

7. The method of claim 1 further comprising the step of sending the identity of the selected crosstalk disturber to a system for spectrum management of a system having a plurality of bundled subscriber loops.

8. An apparatus for identification of the source of crosstalk disturbance in a subscriber loop comprising:
   a means for inputting a signal indicative of the power spectral density of the noise present on a subscriber loop;
   a means for correlating the signal indicative of the power spectral density for said subscriber loop with a predetermined set of power spectral densities for a group of possible crosstalk disturbers;
   a means for selecting the crosstalk disturber having the most closely correlated power spectral density;
   a means for subtracting the power spectral density for the selected crosstalk disturber from the signal indicative of the measured power spectral density of said subscriber loop using spectral subtraction to generate a residual power spectral density; and, a means for mapping negative residual power spectral densities into a non-negative value wherein the mapping function, T, is defined as:

$$T[|\tilde{C}_{i+1}(f)|^2] = \begin{cases} |\tilde{C}_{i+1}(f)|^2, & \text{if } |\tilde{C}_{i+1}(f)|^2 > \beta|C_i(f)|^2 \\ \Phi[|C_i(f)|^2], & \text{otherwise} \end{cases}$$

wherein $|C_{i+1}(f)|^2$ is the residual power spectral density and $\Phi[|C_i(f)|^2]$ is a non-negative function equal to a pre-determined noise floor.

* * * * *